United States Patent [19]

Arai et al.

[11] Patent Number: 5,020,048

[45] Date of Patent: May 28, 1991

[54] OPTICAL INFORMATION RECORDING MEDIUM HAVING A PROTECTIVE FILM WHICH CAN BE STRIPPED

[75] Inventors: Yuji Arai, Gunma; Hiroshi Ogawa; Masahiro Hotori, both of Kanagawa, all of Japan

[73] Assignees: Taiyo Yuden Co., Ltd., Japan; Sony Corporation, Tokyo, Japan

[21] Appl. No.: 449,559

[22] Filed: Dec. 12, 1989

[30] Foreign Application Priority Data

Dec. 17, 1988 [JP] Japan ................................ 63-318808

[51] Int. Cl.$^5$ .............................................. G11B 7/24
[52] U.S. Cl. ...................................... 369/291; 369/283; 369/284; 369/292
[58] Field of Search ............... 369/280, 282, 284, 286, 369/290, 291, 292

[56] References Cited

U.S. PATENT DOCUMENTS 4,879,710  11/1989  Iijima .................................. 369/291

FOREIGN PATENT DOCUMENTS

| 0143992 | 12/1985 | European Pat. Off. | |
| 57-49734 | 3/1982 | Japan | |
| 58-49337 | 4/1983 | Japan | |
| 0175150 | 10/1983 | Japan | 369/284 |
| 60-089842 | 5/1985 | Japan | 369/284 |
| 0123905 | 10/1985 | Japan | 369/284 |
| 1-229441 | 9/1989 | Japan | 369/292 |
| 0694889 | 10/1979 | U.S.S.R. | 369/284 |
| 2155811 | 10/1985 | United Kingdom | 369/284 |

OTHER PUBLICATIONS

Soviet Inventions Illustrated, Section R: Electrical, Week B11, 27 Apr. 1979, Derwent Publications Ltd., London, GB and SU 503288 (Gukalov S.P.) (21.04.76).

*Primary Examiner*—Stuart S. Levy
*Assistant Examiner*—Kenneth B. Wells
*Attorney, Agent, or Firm*—Philip M. Shaw, Jr.

[57] ABSTRACT

An optical information recording medium having at least a transparent substrate and a recording layer and capable of recording an information by irradiating the recording layer with laser beams from the transparent substrate side, wherein a protective film having hygroscopic property is formed on a light incident surface of the transparent substrate so that it can be stripped therefrom.

13 Claims, 1 Drawing Sheet

OPTICAL INFORMATION RECORDING MEDIUM HAVING A PROTECTIVE FILM WHICH CAN BE STRIPPED

BACKGROUND OF THE INVENTION

1. Field of the Invention

The present invention relates generally to optical information recording media and, more particularly, is directed to an optical information recording medium in which a protective film having hygroscopic property is formed on a transparent substrate in such a manner that it can be stripped therefrom.

2. Description of the Prior Art

In an optical information recording medium in which a signal can be recorded and/or reproduced through a transparent substrate, a laser beam is focused on a recording surface from the transparent substrate side, thereby effecting the recording of an information signal. If a light incident surface of the transparent substrate is scratched or smudged, then a laser beam incident on the recording surface is hindered by scratches, dust or the like so that, upon recording, pits can not be formed on the recording surface accurately. Consequently, it is frequently observed that a recorded signal can not be reproduced in high fidelity. In particular, in an optical information recording medium in which a transparent substrate is made of resin, such as, polycarbonate or the like, static electricity is produced on the light incident surface of the substrate so that this surface is easily smudged by dust and so on. Further, if the light incident surface of the transparent substrate is rubbed by something very hard or shocked from the outside, the surface of the transparent substrate is easily scratched and damaged, making the above-mentioned problem more serious.

In order to protect the light incident surface of the transparent substrate from being smudged by dust or in order to protect the surface of the transparent substrate from being damaged by friction or shock from the outside, the following optical information recording media are proposed. These previously-proposed optical information recording media are disclosed in Japanese Utility Model Laid-Open Gazettes Nos. 60-60019, 57-49734 and 58-49337.

Japanese Utility Model Laid-Open Gazette No. 60-60019 proposes a magneto-optical recording medium in which a transparent plastic film cover is bonded only around a center hole of an optical recording medium such as a compact disc or the like by means of a bonding agent. In this recording medium, however, the transparent plastic cover is bonded only around the center hole of the optical recording medium so that the whole surface of the recording medium cannot be protected from dust and the like completely.

Japanese Utility Model Laid-Open Gazette No. 57-49734 proposes an optical recording medium in which a protective film is formed on the surface of a transparent protective layer of the optical recording medium so that it can be stripped therefrom. In this recording medium, however, the above-mentioned protective film is not treated to be protected from static electricity caused by dust. There is then a possibility that dust adhere to the light incident surface of the optical recording medium due to static electricity caused when the protective film is stripped from the surface of the transparent protective layer.

Japanese Utility Model Laid-Open Gazette No. 58-49337 proposes a recording medium in which a transparent film is formed through a bonding layer on a static electricity preventing layer formed by metalizing indium oxide so that the transparent film can be stripped from the static electricity preventing layer. This recording medium needs the static electricity preventing layer and the bonding layer, thereby increasing the manufacturing-process of the recording medium more than necessary.

OBJECTS AND SUMMARY OF THE INVENTION

Accordingly, it is an object of the present invention to provide an improved optical information recording medium which can eliminate the above-mentioned defects encountered with the prior art.

More specifically, it is an object of the present invention to provide an improved optical information recording medium in which a protective film, which can perfectly protect the whole light incident surface of a recording medium, is formed on the light incident surface so as to be easily stripped therefrom.

It is another object of the present invention to provide an improved optical information recording medium in which a protective film having hygroscopic property is formed on a light incident surface of a transparent substrate so that it can be stripped therefrom.

According to a first aspect of the present invention, there is provided an optical information recording medium having at least a transparent substrate and a recording layer and capable of recording an information by irradiating said recording layer with laser beams from said transparent substrate side, comprising:

a protective film having hygroscopic property formed on a light incident surface of said transparent substrate in such a manner that it can be stripped therefrom.

According to a second aspect of the present invention, there is provided an optical information recording medium having at least a transparent substrate and a recording layer made of organic dye-based optical recording material and capable of recording an information by irradiating said recording layer with laser beams from said transparent substrate side, comprising:

a protective film colored by a colorant of dark color and formed on a light incident surface of said transparent substrate in such a manner that it can be stripped therefrom.

According to a third aspect of the present invention, there is provided an optical information recording medium having at least a transparent substrate and a recording layer and capable of recording an information by irradiating said recording layer with laser beams from said transparent substrate side, comprising:

a protective film made of resin containing an antistatic agent and formed on a light incident surface of said transparent substrate in such a manner that it can be stripped therefrom.

BRIEF DESCRIPTION OF THE DRAWINGS

A better understanding of the objects, features and advantages of the invention can be gained from a consideration of the following detailed description of the preferred embodiments thereof, in conjunction with the figures of the accompanying drawings wherein.

DETAILED DESCRIPTION OF PREFERRED EMBODIMENTS

Figure 1:
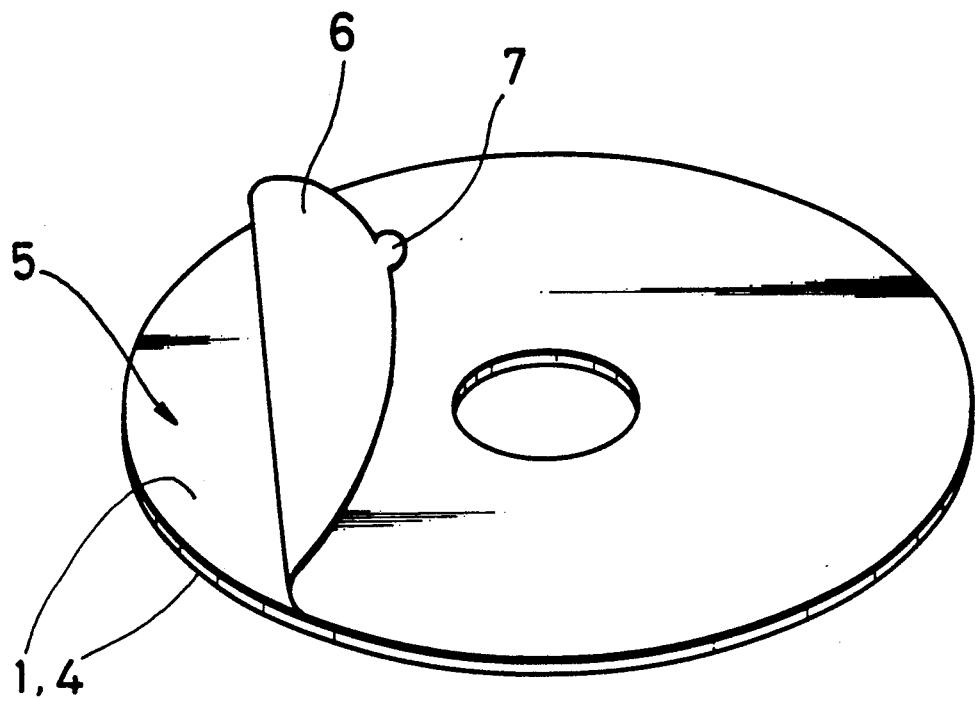
FIG. 1 is a perspective view of an overall arrangement of an optical disc, and to which reference will be made in explaining an embodiment of the present invention.
Figure 2:
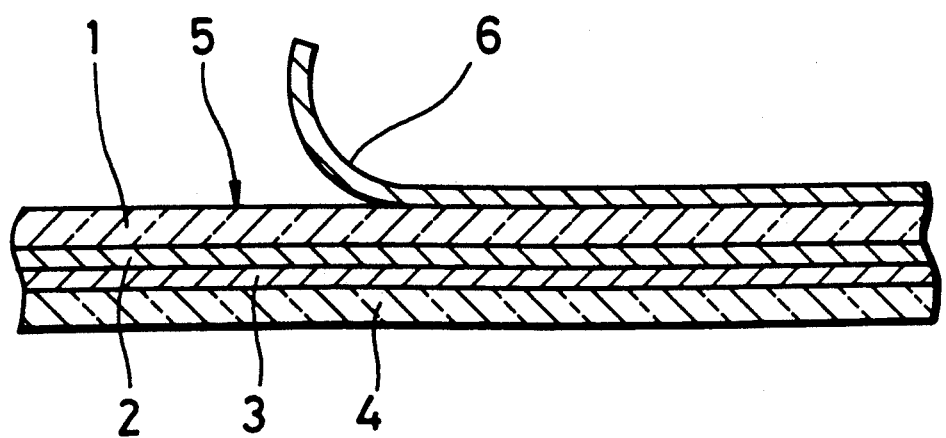
FIG. 2 is a side view of a section of the optical disc of FIG. 1 and illustrating a main portion thereof in an enlarged scale.

An optical information recording medium according to the present invention will be described with reference to FIGS. 1 and 2. In FIGS. 1 and 2, it will be seen that an optical information recording medium is comprised of a transparent substrate 1, a recording layer 2, a reflecting layer 3, a protective layer 4, a light incident surface 5 of the transparent substrate 1 and a protective film 6.

In order to achieve the effects of the present invention, the transparent substrate 1 is preferably made of a synthetic resin plate, such as, polycarbonate resin plate, acrylic resin plate and epoxy resin plate, each having high optical transmissivity mainly for laser beams and having excellent shock resistance. In this case, the transparent substrate 1 may be formed of a glass plate, and alternatively, this transparent substrate 1 may be formed of a plurality of layers.

The recording layer 2 is adapted to record thereon information by changing optical characteristics of its portion which is not irradiated with laser beams when irradiated with a laser spot of a recording laser beam. In other words, the recording layer 2 is a layer which is related to the recording. Further, this recording layer 2 is not limited to a layer in which a physical change of shape, for example, a pit is produced. The recording layer 2 is formed by uniformly coating, for example, cyanine-based dye, dissovled by a solvent, on the surface of the transparent substrate 1 by means of a socalled spin-coating method or the like. The light absorption layer, i.e., the recording layer 2 can achieve the effects of the present invention so long as it is made of an optical recording material according to the prior art. In this case, it is preferable that the recording layer 2 is made of an organic dye-based optical recording material having light absorption property. The recording layer 2 can be formed by means of well-known film forming methods, such as, vapor-deposition method or metalizing method, light bombardment (LB) method or the like, in addition to the above-mentioned spin-coating method.

The reflecting layer 3 is laminated on the recording layer 2. The reflecting layer 3 is formed by means of metalizing or sputtering metals, such as, gold, silver, copper, aluminum or alloy of them. If the reflecting layer 3 is provided as in the embodiment of the present invention, the recording can be effected by utilizing a reflected laser beam of the reflecting layer 3, thus achieving the effects of the present invention more effectively.

The protective layer 4 is laminated on the reflecting layer 3. The protective layer 4 is made of synthetic resin, such as ultraviolet curing resin, epoxy resin, acrylic resin, silicone-based hard coat resin or the like, each having similar excellent shock resistance to that of the resins forming the transparent substrate 1. The reflecting layer 3 and the protective layer 4 are not always provided, and may be selectively formed. Without the reflecting layer 3 and the protective layer 4, it is possible to achieve the effects of the present invention.

The protective film 6 according to the present invention is made of a material having hygroscopic property. When the protective film 6 having hygroscopic property is provided, static electricity can be prevented from being produced when the protective film 6 is stripped from the light incident surface 5. Thus, the light incident surface 5 of the transparent substrate 1 can be protected from being smudged by dust.

The protective film 6 can be given a hygroscopic property by using resin having a hydroxyl group or by mixing an antistatic agent into the material forming the protective film 6. A resin having a hydroxyl group may be, for example, polyvinyl alcohol or the like. When the resin such as polyvinyl alcohol and so on is used, the protective film 6 can be formed by the spin-coating method. When the protective film 6 of polyvinyl alcohol is formed on the light incident surface 5 of the transparent substrate 1 by the spin-coating method as described above, it is possible to form with ease a protective film 6 which does not need a bonding layer and which makes it difficult to produce static electricity when stripped from the light incident surface 5 of the transparent substrate 1.

The antistatic agent, mixed with to the material of the protective film 6, may be a conductive material or a surface active agent. More specifically, examples of the surface active agent are as follows:

Amphoteric surface active agent may be, for example, alkyl betaine, alkyl aminoxide, alkyl trimethyl ammonium salt and so on; nonionic surface active agent may be, for example, polyoxyethylene alkyl amine and so on; anion surface active agent may be, for example, alkyl phosphate and so on; cation surface active agent may be, for example, alkyl amine acetate or the like; and cyclohexane-based surface active agent may be, for example, acrylic acid having a functional group or methacrylic acid polymer. Further, it is possible to use an antistatic agent which is provided by mixing a plurality of the above-mentioned antistatic agents.

When the recording layer 2 is made of an organic dye-based optical recording material, it becomes possible to improve light resistance of the recording layer 2 by coloring the protective film 6. To be more concrete, the protective film 6 can be colored by mixing into the resin material of the protective film 6 a dark color-based colorant, such as, Rhodamine B, Rhodamine 19, Brilliant Green, Methylene Blue or the like.

The shape of the above-mentioned protective film 6 is determined in accordance with that of the transparent substrate 1. Even when the protective film 6 is formed so as to cover only the recording area of the recording layer 2, it is possible to achieve the effects of the present invention.

Furthermore, as shown in FIG. 1, if one or more protruding tabs 7 are provided at the circumferential portion of the protective film 6, then it becomes possible for the user to strip the protective film 6 from the light incident surface 5 by holding the tab 7 with fingers. Thus, the user can strip the protective film 6 from the light incident surface 5 with ease. The tab 7 can be formd with ease by a bonding seal or the like to the protective film 6 after it is formed.

Examples of the present invention will be described hereinafter. According to this embodiment, the optical information recording medium was manufactured in the following order.

The transparent substrate 1 was molded, by the injection molding-process, as a polycarbonate disc having a thickness of 1.2 mm, an outer diameter of 120 mm φ and an inner diameter of 15 mm φ in which there were formed spiral-shaped pre-grooves having a width of 0.8 μm, a depth of 0.08 μm and a track pitch of 1.6 μm in a range of a diameter of 46 to 117 mm φ. In order to form on the transparent substrate 1 a light absorption layer which becomes the optical recording layer 2, 0.65 g of 1, 1, dibutyl 3, 3, 3', 3' tetramethyl 4, 5, 4' 5' dibenzoindo dicarbocyanine perchlolate (product No. NK3219, manufactured by Nippon Kanko Shikiso Kabushiki Kaisha) was dissolved into 10 ml of diacetone alcohol solvent. The resultant solution was coated on the surface of the transparent substrate 1 by the spin-coating method, thus a light absorption layer of 130 nm thick being formed. In the next process, an Au film of 70 nm thick was formed on the transparent substrate 1 on which the light absorption layer was formed as the optical recording layer 2 at its whole surface of an area having a diameter of from 45 to 118 mm φ by the metal-izing-process, thereby forming the reflecting layer 3. Further, an ultraviolet curing resin was coated on the reflecting layer 3 by the spin-coating method, and was cured by the irradiation of ultraviolet rays, thus the protective layer 4 of 10 μm thick being formed.

Then, a concentration of polyvinyl alcohol aqueous solution was adjusted to be 12.5%, and the resultant polyvinyl alcohol aqueous solution was coated on the light incident surface 5 of the transparent substrate 1 by means of spray, left for 5 minutes, levelled by a levell-ing-process and was dried at 50° C. for 30 minutes, thereby forming the polyvinyl alcohol protective film 6 the thickness of which on the light incident surface 5 of the transparent substrate 1 was thin.

Although the protective film 6 according to this em-bodiment stays bonded to the light incident surface 5 of the transparent substrate 1 by its own bonding force, the protective film 6 can be stripped from the light incident surface 5 of the transparent substrate 1 with ease by holding the tab 7 with fingers as shown in FIG. 1.

According to the optical information recording me-dium of the present invention, during the period in which the optical information recording medium is delivered as the product, transported, bought by the user and the recording is made, the light incident sur-face of the transparent substrate is protected so that the light incident surface can be effectively protected from being smudged by dust or from being damaged. Also, the recording can be correctly made by stripping the protective film from the light incident surface just be-fore laser beams are irradiated on the recording portion to record an information in the user side.

Further, since the protective film of the invention has hydroxyl group and hygroscopic property, static elec-tricity, caused by friction, can be prevented from being produced in the protective film and the transparent substrate. Thus, when the protective film is provided or immediately after the protective film is stripped from the light incident surface of the transparent substrate, the light incident surface of the transparent substrate can be effectively protected from dust in the air.

Having described preferred embodiments of the in-vention with reference to the accompanying drawings, it is to be understood that the invention is not limited to those precise embodiments and that various changes and modifications may be effected by one skilled in the art without departing from the scope or spirit of the invention as defined in the appended claims.

We claim as our invention:

1. An optical information recording medium having at least a transparent substrate and a recording layer which is capable of recording information when irradi-ated with laser beams from the transparent substrate side, comprising:

a protective, hygroscopic, antistatic electricity film formed on a light incident surface of the transpar-ent substrate in such a manner that the protective film can be stripped therefrom.

2. An optical information recording medium accord-ing to claim 1, wherein the protective film is made of resin having a hydroxyl group.

3. An optical information recording medium accord-ing to claim 2, wherein the protective film is made of polyvinyl alcohol.

4. An optical information recording medium accord-ing to claim 1 or 2, wherein the protective film is col-ored by a colorant selected from the group consisting essentially of Rhodamine B, Rhodamine 19, Brilliant Green, and Methyline Blue.

5. An optical information recording medium accord-ing to claim 4, wherein the recording layer is made of an organic dye-based optical recording material.

6. An optical information recording medium accord-ing to claim 1, wherein the protective film includes an electrically conductive material.

7. An optical information recording medium accord-ing to claim 1, wherein the protective film includes a surface active agent.

8. An optical information recording medium accord-ing to claim 1, wherein the protective film includes an amphoteric surface active agent.

9. An optical information recording medium accord-ing to claim 1, wherein the protective film includes a nonionic surface active agent.

10. An optical information recording medium accord-ing to claim 1, wherein the protective film includes an anion surface active agent.

11. An optical information recording medium accord-ing to claim 1, wherein the protective film includes a cation surface active agent.

12. An optical information recording medium accord-ing to claim 1, wherein the protective film includes a cyclohexane-based surface active agent.

13. An optical information recording medium accord-ing to claims 1 or 2, wherein the protective film includes one or more of the following surface active agent com-pounds: alkyl betaine, alkyl aminoxide, alkyl trimethly ammonium salt, polyoxyethylene alkyl amine, alkyl phosphate, alkyl amine acetate, acrylic acid having a functional group, and methacrylic acid polymer.

* * * * *